United States Patent [19]

Hunter

[11] Patent Number: 4,930,873

[45] Date of Patent: Jun. 5, 1990

[54] OPTICAL FLIP-FLOP

[76] Inventor: Bryan D. Hunter, P.O. Box 93, Vanderbilt, Mich. 49795

[21] Appl. No.: 248,136

[22] Filed: Sep. 23, 1988

[51] Int. Cl.$^5$ .............................................. G02F 1/35
[52] U.S. Cl. .................................................. 350/354
[58] Field of Search ............... 350/354, 353, 355, 356, 350/3.6, 3.64; 372/21, 22

[56] References Cited

U.S. PATENT DOCUMENTS

| 4,496,222 | 1/1985 | Shah | 350/354 |
| 4,701,030 | 10/1987 | Jewell | 350/354 |
| 4,762,394 | 8/1988 | Kwong et al. | 350/354 X |
| 4,768,846 | 9/1988 | Connors et al. | 350/354 X |

OTHER PUBLICATIONS

Pepper, "Applications of Optical Phase Conjugation", Scientific American, vol. 254, No. 1, Jan. 1986, pp. 74-83.

Primary Examiner—Eugene R. LaRoche
Assistant Examiner—Nathan W. McCutcheon
Attorney, Agent, or Firm—Lyman R. Lyon

[57] ABSTRACT

An optical flip-flop comprises a phase-conjugating mirror; a one-way mirror having its reflective side facing the phase-conjugating mirror; a "set" light pulse directed towards the phase-conjugating mirror through the transmissive side of the one-way mirror for initiating a reference light beam which thereafter reflects continuously along an auto-collimating path between the mirrors; a normally transmissive optical gate along the path of the reference beam which is rendered non-transmissive relative thereto upon interaction with a "reset" light pulse; a plurality of filters positioned between the mirrors to prevent the self-starting of the reference beam therebetween; and means for deriving an output signal from the reference beam. An optical logic device comprises a plurality of such flip-flops sharing a single set of mirrors, whereby increased system compactness and simplicity is achieved.

17 Claims, 1 Drawing Sheet

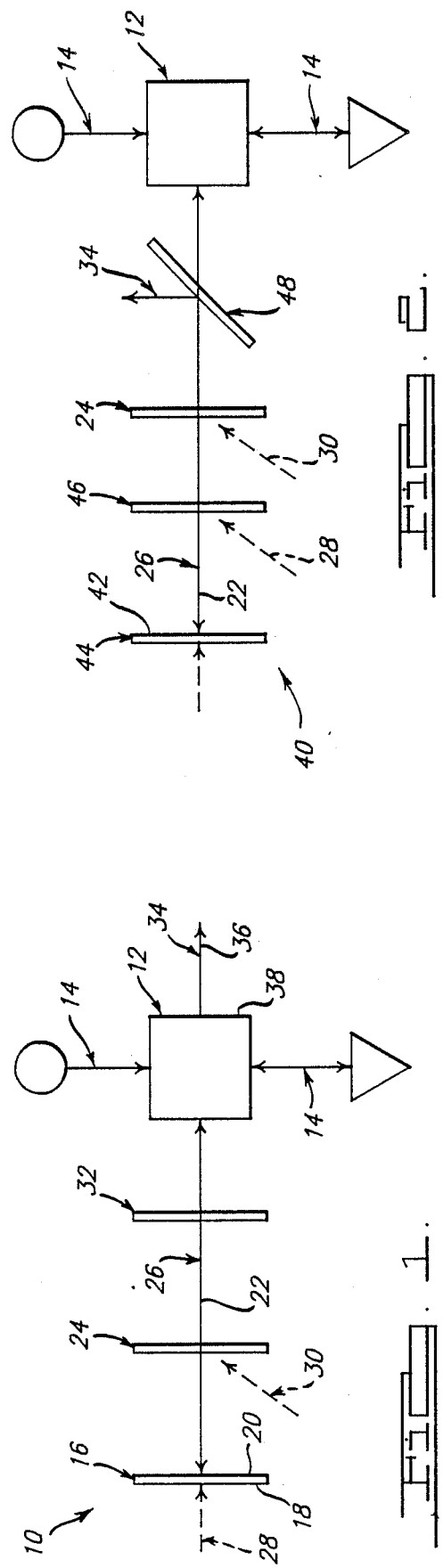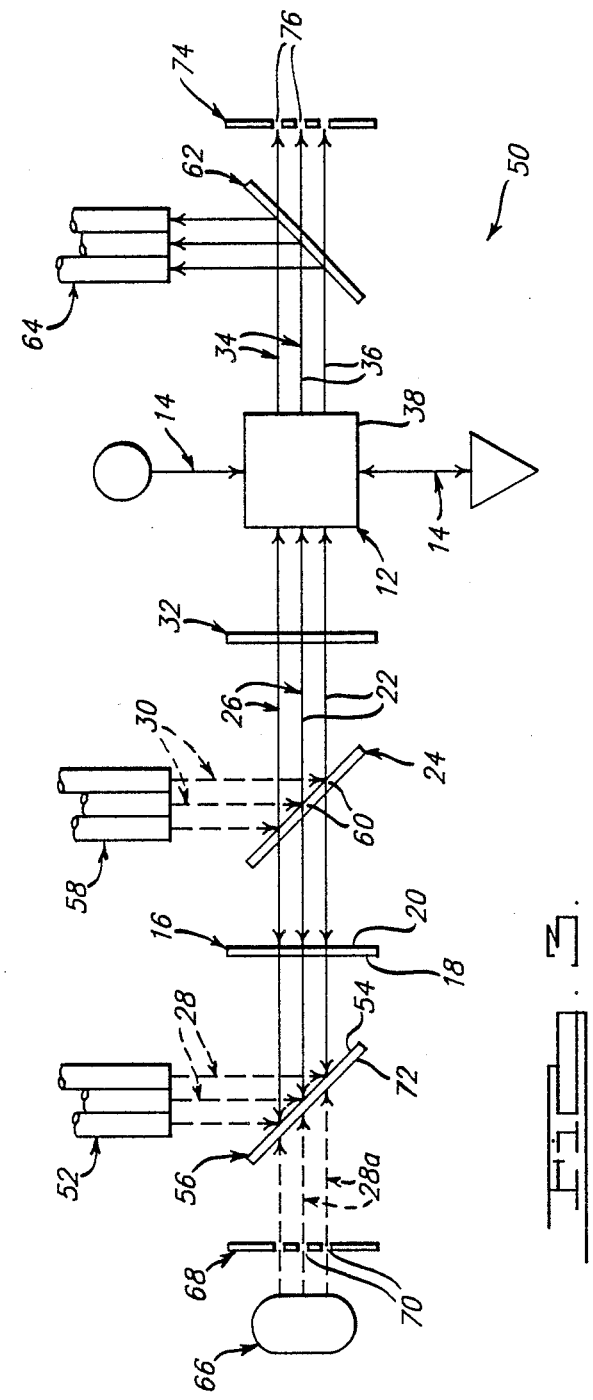

OPTICAL FLIP-FLOP

BACKGROUND OF THE INVENTION

The instant invention relates to optical bistable devices, or optical flip-flops, for use in optical logic devices.

An example of a known optical flip-flop is taught by Jewell in U.S. Pat. No. 4,573,767, issued Mar. 4, 1986. Jewell teaches a flip-flop comprising a pair of optically aligned non-linear Fabry-Perot etalons. The transmissivity of each etalon is manipulated by the impingement thereupon of one of a pair of pulsed laser beams. The varying transmissivity of the etalons in turn controls a signal beam directed therethrough from a light source in optical alignment therewith. Unfortunately, as with other prior art optical flip-flops employing media having variable refractive indices or absorption coefficients, the transmitted light signal undergoes appreciable attenuation upon passage through the etalons, thereby requiring periodic reamplification of the transmitted signal. In his U.S. Pat. No. 4,630,898, issued Dec. 23, 1986, Jewell teaches an etalon optical logic gate which seeks to minimize attenuation of the transmitted light signal but does not eliminate it.

It is noted that the instant invention utilizes optical phase conjugation in order to generate a bistable reference beam from which an output beam is derived. The operating principles and general construction of one form of phase-conjugating means— phase-conjugating mirrors—are discussed in V. Shkunov et al., "Optical Phase Conjugation", *Scientific American*, December, 1985, pp. 54–59. Briefly, a phase-conjugating mirror is a mirror which, by the process of optical phase conjugation, reflects impinging light back along its incident path in a "time-reversed" fashion. One type of phase-conjugating mirror uses a method known as four-wave mixing wherein a pair of "pump" beams and a probe beam impinge upon a non-linear medium. The probe beam interacts with one of the pump beams to distort the medium, while the other of the pump beams interacts with the resulting distortions to produce a "time-reversed" replica beam which travels back along the incident path of the probe beam. A fourth beam is generated within the phase-conjugating mirror by such interaction and exits the phase-conjugating mirror in the original direction of travel of the probe beam. See the Shkunov article referred to hereinabove, and D. Pepper, "Applications of Optical Phase Conjugation", *Scientific American*, January, 1986, pp. 74–83. Additionally, it is noted that some types of phase conjugators are capable of spontaneously generating an autocollimated, continuously reflecting light beam with a surface of sufficient reflectivity exposed thereto.

SUMMARY OF THE INVENTION

It is the object of the instant invention to provide an optical flip-flop through which a signal beam may pass without suffering appreciable attenuation.

It is also the object of the instant invention to provide an optical flip-flop having signal amplification means integral therewith, whereby the transmitted, or output, signal has an amplitude equal to or greater than that of the incident, or input, signal.

A further object of the instant invention is to provide a means for simply combining a plurality of optical flip-flops in a compact array to facilitate the formation of complex logic devices.

The optical flip-flop of the instant invention comprises phase-conjugating means for reflecting light impinging thereupon back along its incident path; a reflective element facing the phase-conjugating means to provide an autocollimating light path therebetween; means for initiating an autocollimated reference light beam along the autocollimating path, as by directing a "set" light pulse along the autocollimating path; and a normally transmissive optical gate positioned along the autocollimating path which is rendered nontransmissive to the reference beam when interacting with a "reset" light pulse directed theretowards. Subsequent to its initiation by the set pulse, the reference beam thus reflects continuously between the phase-conjugating means and the reflective element until terminated by the reset pulse.

The output of the flip-flop comprises a second light beam emitted by the phase-conjugating means along a path other than the autocollimating path of the reference beam. Alternatively, the flip-flop comprises mean for deriving an output beam from the reference beam, such as a partially reflective lens positioned along the autocollimating path which reflects a portion of the reference beam away therefrom.

In operation, the set pulse initiates a reference beam traveling along the autocollimating path between the phase-conjugating means and the reflective element. Once initiated, the reference beam reflects continuously between the phase-conjugating means and the reflective element along the autocollimating path therebetween, and an output beam derived from the reference beam is emitted from the flip-flop. The reference beam and, hence, the output beam corresponding thereto are terminated when the autocollimating path between the phase-conjugating means and the reflective element is rendered nontransmissive to the reference beam, as when the normally transmissive optical gate along the path is rendered nontransmissive upon interaction with the reset pulse. When such interaction between the reset pulse and the optical gate ceases, the optical gate returns to its normally transmissive state and the flip-flop is once again ready to receive a set pulse to initiate another reference beam. In this manner, the optical flip-flop of the instant invention achieves a bistable output that is controlled by the set and reset pulses.

It is noted that, where the phase-conjugating means is capable of spontaneously generating an autocollimated light beam with any surface of sufficient reflectivity exposed thereto, the optical flip-flop of the instant invention further comprises a plurality of filters positioned between the phase-conjugating means and any such reflective surface so as to prevent such self-starting of the reference beam in the absence of a set pulse therefor. Moreover, the filter may comprise the means for initiating the reference beam: the filter may comprise a normally nontransmissive optical gate which is rendered transmissive when interacting either with a "set" light pulse directed theretowards or the reference beam passing therethrough. Thus, once the normally nontransmissive optical gate is rendered transmissive by the set pulse and the reference beam is initiated by the self-starting ability of the phase-conjugating means, the reference beam will reflect continuously between the phase-conjugating means and the reflective element until the normally transmissive optical gate is rendered nontransmissive upon interaction with a reset pulse.

It is noted that the reference and/or output beams are amplified by the phase-conjugating means through manipulation of the intensity of the "pumps" thereof in order to prevent attenuation of the optical signals processed by the instant flip-flop. Indeed, it will be readily appreciated that the instant flip-flop may thus be utilized to amplify the signals processed thereby sufficiently to compensate for signal attenuation found elsewhere in an optical logic device comprising a plurality of such flip-flops.

The optical logic device of the instant invention comprises a plurality of the instant flip-flops sharing a common phase-conjugating means and a common reflective element to provide greater system compactness and simplicity.

BRIEF DESCRIPTION OF THE DRAWINGS

In the drawings, in which like reference numerals are employed to designate identical components in the various embodiments of the instant invention:

FIG. 1 is a diagrammatic schematic of an optical flip-flop in accordance with the instant invention;

FIC. 2 is a diagrammatic schematic of an alternate embodiment of the flip-flop including a phase-conjugating mirror capable of spontaneously generating a reference beam with a reflective surface exposed thereto, and a partially reflective lens positioned in the path of the reference beam for deriving an output beam therefrom; and FIC. 3 is a schematic representation of an optical logic device comprising a two-dimensional array of the optical flip-flops shown in FIG. 1.

DETAILED DESCRIPTION OF THE PREFERRED EMBODIMENT OF THE INVENTION

Referring to FIG. 1, an exemplary embodiment 10 of the optical flip-flop of the instant invention comprises a four-wave phase-conjugating mirror 12 having pump beams 14, a one-way mirror 16 having a transmissive side 18 and a reflective side 20 facing the phase-conjugating mirror 12 to provide a path 22 therebetween resulting in the autocollimation and continuous reflection of light traveling therebetween (i.e., light traveling along the path 22 is continuously reflected by each of the mirrors 12 and 16 back along the identical path 22), and a normally transmissive optical gate 24 positioned between the mirrors 12 and 16 along the autocollimating path 22 therebetween. An autocollimated light beam 26 reflecting continuously between the mirrors 12 and 16 (hereinafter "reference beam 26") is initiated by a first light pulse (hereinafter "set pulse 28") which is directed through the transmissive side 18 of the one-way mirror 16 so as to travel along the autocollimating path 22 between the mirrors 12 and 16. The optical gate 24, which is normally transmissive to the reference beam 26, is momentarily rendered nontransmissive thereto when interacting with a second light pulse (hereinafter "reset pulse 30") directed theretowards, whereby the reference beam 26 is terminated. When such interaction between the reset pulse 30 and the optical gate 24 ceases, the optical gate 24 returns to its normally transmissive state, and the flip-flop 10 is once again ready to receive another set pulse 28 for initiation of another reference beam 26. In this manner, the presence or absence of the continuously reflecting reference beam 26 is controlled by the set and reset pulses 28 and 30, respectively, which are directed towards the flip-flop. A filter 32 is positioned along the autocollimating path 22 between the mirrors 12 and 16 in order to prevent the spontaneous generation of the reference beam 26 in the absence of a set pulse 28 therefor.

The output of the flip-flop 10 comprises a second light beam 34 (hereinafter "output beam 34") emitted by the phase-conjugating mirror 12 along a path 36 other than the autocollimating path 22 of the reference beam 26 during the continuous reflection thereof. Where the phase-conjugating mirror 12 utilizes four-wave mixing, as in the instant embodiment 10, the output beam 34 exits the phase-conjugating mirror 12 through the back side 38 thereof so as to travel along a path 36 collinear with the autocollimating path 22.

In operation, a set pulse 28 is directed through the transmissive side 18 of the one-way mirror 16 so as to travel along the autocollimating 22 path between the mirrors 12 and 16, whereupon the reference beam 26 is initiated. Once initiated, the reference beam 26 reflects continuously between the phase-conjugating mirror 12 and the reflective side 20 of the one-way mirror 16 along the autocollimating path 22 therebetween, and an output beam 34 derived from the reference beam 26 is emitted from the flip-flop 10. The reference beam 26 and, hence, its corresponding output beam 34 are terminated when the autocollimating path 22 between the mirrors 12 and 16 is rendered nontransmissive to the reference beam 26, as when the normally transmissive optical gate 24 along the path 22 is rendered nontransmissive thereto upon interaction with the reset pulse 30. When such interaction between the reset pulse 30 and the optical gate 24 ceases, the optical gate 24 returns to its normally transmissive state and the flip-flop 10 is once again ready to receive a set pulse 28 to initiate another reference beam 26. In this manner, the optical flip-flop 10 of the instant invention achieves a bistable output that is controlled by the set and reset pulses 28 and 30.

It is noted that the reference and/or output beams 26 and 34 are amplified by the phase-conjugating mirror 12 through manipulation of the intensity of the pump beams 14 thereof in order to prevent attenuation of the optical signals processed by the instant flip-flop. Indeed, it will be readily appreciated that the instant flip-flop may thus be utilized to amplify the signals processed thereby sufficiently to compensate for signal attenuation found elsewhere in an optical logic device comprising a plurality of such flip-flops.

An alternate embodiment 40 of the flip-flop of the instant invention is shown schematically in FIG. 2. The alternate embodiment 40 capitalizes on the ability of certain phase-conjugating mirrors to spontaneously generate a continuously reflecting reference beam 26 when exposed to a highly reflective surface 42 on an element, such as a mirror 44, in opposition therewith. The alternate embodiment 40 further comprises a normally nontransmissive optical gate 46 positioned along the autocollimating path 22 between the mirrors 12 and 16 which is rendered transmissive when interacting either with a set pulse 28 directed theretowards or the reference beam 26 passing therethrough. Thus, once the normally nontransmissive optical gate 46 is rendered transmissive by the set pulse 28 and the reference beam 26 is initiated by the self-starting ability of the phase-conjugating mirror 12, the reference beam 26 reflecting continuously between the mirrors 12 and 16 will be maintained until the normally transmissive optical gate 24 in its path 22 is rendered nontransmissive upon interaction with a reset pulse 30 directed theretowards, as described hereinabove with respect to the first embodiment 10 of the instant flip-flop.

Additionally, the alternate embodiment 40 further comprises means for deriving an output beam 34 from the reference beam 26 thereof, such as a partially reflective lens 48 positioned along the autocollimating path 22 thereof so as to reflect a portion of the reference beam 26 away therefrom, as shown in FIG. 2. It will be readily appreciated that an output beam 34 is therefore present only when the reference beam 26 is reflecting continuously between the phase-conjugating mirror 12 and the mirror 16.

FIG. 3 is a schematic representation of an optical logic device 50 constructed in accordance with the instant invention is shown schematically in FIC. 3. The optical logic device 50 comprises a plurality of the instant flip-flops sharing a common phase-conjugating mirror 12 and a common reflective element, such as a one-way mirror 16, in opposition therewith. A plurality of distinct autocollimating paths 22 thus extend between the phase-conjugating mirror 12 and the reflective side 20 of the one-way mirror 16 to provide a two-dimensional array of flip-flops characterized by greater system compactness and simplicity.

A plurality of discrete reference beams 26 traveling along the paths 22 are controlled by a plurality of dedicated set and reset pulses 28 and 30 as previously described hereinabove with respect to the individual flip-flops illustrated in FIGS. 1 and 2. Thus, each set pulse 28 initiates a specific reference beam 26 which continuously reflects along its distinct autocollimating path 22 until terminated by its dedicated reset pulse 30.

For example, in the optical logic device 50 shown in FIG. 3, each dedicated set pulse 28, suitably delivered to the instant optical device 50 by an array of optical fibres 52, is directed through the transmissive side 18 of the first one-way mirror 16 and along its corresponding autocollimating path 22 by the reflective side 54 of a second one-way mirror 56. Each reset pulse 30, also delivered to the device 50 via an optical fibre array 58, is directed towards a specific, independently operable location 60 on the optical gate 24 through which its corresponding reference beam 26 passes. A filter 32 is interposed between the phase-conjugating mirror 12 and the first one-way mirror 16 to prevent the self-starting of the reference beams 26 in the absence of the set pulses 28 therefor.

The optical logic device 50 provides a plurality of output beams 34, each of which is derived from a specific reference beam 26 and, thus, controlled by its dedicated pair of set and reset pulses 28 and 30. The output beams 34 exit the back side 38 of the phase-conjugating mirror 12 along paths 36 collinear with the reference beams 26 corresponding therewith and are directed by a beam-splitter 62 into an array of optical fibres 64 for delivery to other optical logic devices.

FIG. 3 additionally shows a momentary light source 66 and a mask 68 having a plurality of apertures 70 therein aligned so as to direct a two-dimensional array of set pulses 28a through the transmissive side 72 of the second one-way mirror 56 and along discrete autocollimating paths 22 between the first one-way mirror 16 and the phase-conjugating mirror 12, thereby initiating the reference beams 26 corresponding thereto. In this manner, parallel data entry into the optical logic device 50 of the instant invention is readily achieved. Similarly, FIG. 3 shows the output beams 34 from the optical logic device 50 impinging upon a storage medium 74 affected by such light impingement so as to record such output in a parallel fashion, as by forming apertures 76 in the medium 76. The output medium 76 can thereafter be used as the input mask 68 for subsequent data entry, in the manner described hereinabove.

While the preferred embodiment of the invention has been disclosed, it should be appreciated that the invention is susceptible of modification without departing from the spirit of the invention or the scope of the subjoined claims.

I claim:

1. An optical flip-flop comprising:
   a phase-conjugating mirror;
   a reflective element facing said phase-conjugating mirror;
   means for initiating a reference beam of coherent electromagnetic radiation reflecting continuously between said phase-conjugating mirror and said reflective element along a path therebetween;
   means for terminating said reference beam; and
   means for deriving an output beam from said reference beam, said output beam being present only during such continuous reflection of said reference beam between said phase conjugating mirror and said reflective element.

2. The optical flip-flop of claim 1 wherein said reflective element comprises a one-way mirror having a reflective side facing said phase-conjugating mirror and a transmissive side, and said means for initiating said reference beam comprises a pulse of coherent electromagnetic radiation directed through said transmissive side of said one-way mirror towards said phase-conjugating mirror along said path therebetween.

3. The optical flip-flop of claim 2 further comprising a filter interposed between said one-way mirror and said phase-conjugating mirror, said filter preventing spontaneous generation of said reference beam prior to the initiation thereof by said pulse.

4. The optical flip-flop of claim 1 wherein said means for initiating said reference beam comprises a normally nontransmissive optical gate interposed between said reflective element and said phase-conjugating mirror along said path therebetween, said normally nontransmissive optical gate being rendered transmissive when interacting with a pulse of coherent electromagnetic radiation directed theretowards to permit spontaneous generation of said reference beam, said normally nontransmissive optical gate also being transmissive when interacting with said reference beam.

5. The optical flip-flop of claim 1 wherein said means for terminating said reference beam comprises a normally transmissive optical gate positioned along said path of said reference beam between said phase-conjugating mirror and said reflective element, said normally transmissive optical gate being rendered nontransmissive to said reference beam when interacting with a pulse of coherent electromagnetic radiation directed theretowards.

6. The optical flip-flop of claim 1 wherein said means for deriving an output signal from said reference beam comprises a partially reflective lens positioned in the path of said reference beam so as to reflect a portion thereof away from said path.

7. An optical flip-flop comprising
   a phase-conjugating mirror;
   an element having a reflective surface facing said phase-conjugating mirror;

means for providing a light pulse traveling along a first path between said phase-conjugating mirror and the reflective surface of said element for impingement upon said phase-conjugating mirror, said pulse initiating a first light beam which reflects continuously between said phase-conjugating mirror and the reflective surface of said element along said first path, said phase-conjugating mirror emitting a second light beam along a second path other than said first path during such continuous reflection of said first beam; and optical gate means positioned along said first path for preventing the continued reflection of said first beam between said phase-conjugating mirror and the reflective surface of said element, whereby the emission of said second beam by said phase-conjugating mirror is prevented.

8. The optical flip-flop of claim 7 wherein said element having a reflective surface comprises a one-way mirror having a reflective side and a transmissive side, and wherein said pulse is directed through said transmissive side of said one-way mirror towards said phase-conjugating mirror along said first path therebetween.

9. The optical flip-flop of claim 8 further comprising a filter interposed between said one-way mirror and said phase-conjugating mirror, said filter preventing spontaneous generation of said first beam therebetween prior to the initiation thereof by said pulse.

10. The optical flip-flop of claim 7 wherein said optical gate means for preventing the continued reflection of said first beam comprises a normally transmissive optical gate which is rendered nontransmissive to said first beam when said optical gate interacts with a light pulse directed theretowards.

11. An optical logic device comprising
a phase-conjugating mirror;
light reflecting means facing said phase-conjugating mirror;
means for initiating a plurality of autocollimated reference light beams reflecting continuously between said phase-conjugating mirror and said light reflecting means along a plurality of discrete paths therebetween, respectively;
means for selectively terminating said reference beams; and
means for deriving an output light beam from each of said reference beams, respectively, each of said output beams being present only during such continuous reflection of its respective reference beam between said phase conjugating mirror and said light reflecting means.

12. The optical logic device of claim 11 wherein said light reflecting means comprises a one-way mirror having a reflective side and a transmissive side, and said means for initiating said reference beams comprises a plurality of light pulses directed through said transmissive side of said one-way mirror towards said phase-conjugating mirror along said paths therebetween, respectively.

13. The optical logic device of claim 12 further comprising a filter interposed between said one-way mirror and said phase-conjugating mirror, said filter preventing spontaneous generation of said reference beams, therebetween prior to the initiation thereof by said plurality of pulses, respectively.

14. The optical logic device of claim 11 wherein said means for initiating said reference beams comprises a plurality of normally nontransmissive optical gates interposed between said phase-conjugating mirror and said light reflecting mirror along said paths therebetween, respectively, said plurality of optical gates being rendered transmissive when interacting with a plurality of light pulses directed theretowards, respectively, said optical gates also being rendered transmissive when interacting with said reference beams, respectively.

15. The optical logic device of claim 11 wherein said means for terminating said reference beams comprises a plurality of normally transmissive optical gates positioned along said paths between said phase-conjugating mirror and said light reflecting mirror, respectively, said plurality of optical gates being rendered nontransmissive to said reference beams, respectively, when interacting with a plurality of light pulses directed theretowards, respectively.

16. The optical logic device of claim 11 wherein said means for deriving said plurality of output beams from said reference beams comprises a partially reflective lens positioned along said paths of said reference beams so as to reflect portions thereof away from said paths, respectively.

17. The optical logic device of claim 11 wherein said phase-conjugating mirror generates a plurality of output light beams during such continuous reflection of said reference beams, respectively, along a second plurality of paths, respectively, other than said paths of said reference beams.

* * * * *